United States Patent [19]

Brittain et al.

[11] Patent Number: 4,575,026
[45] Date of Patent: Mar. 11, 1986

[54] GROUND LAUNCHED MISSILE CONTROLLED RATE DECELERATOR

[75] Inventors: Harold G. Brittain, San Diego; Charles B. Brantley, Poway, both of Calif.

[73] Assignee: The United States of America as represented by the Secretary of the Navy, Washington, D.C.

[21] Appl. No.: 626,958

[22] Filed: Jul. 2, 1984

[51] Int. Cl.⁴ .............................................. B64F 1/04
[52] U.S. Cl. .................................. 244/63; 244/110 R; 244/110 A; 434/12; 188/371
[58] Field of Search ................ 244/63, 110 A, 110 E, 244/110 C, 110 H, 110 R; 188/371, 40, 43; 89/1.1, 198; 42/1 R; 434/12; 346/38; 73/117.1, 432 K, 432 V, 221

[56] References Cited

U.S. PATENT DOCUMENTS

| | | | |
|---|---|---|---|
| 3,390,743 | 7/1968 | Yoss | 244/110 C |
| 3,519,301 | 7/1970 | Somnitz | 188/371 |
| 3,779,591 | 12/1973 | Rands | 293/133 |
| 3,938,627 | 2/1976 | Nagazumi | 188/371 |
| 4,181,198 | 1/1980 | Lindberg | 293/133 |

*Primary Examiner*—Galen L. Barefoot
*Attorney, Agent, or Firm*—Robert F. Beers; Joseph M. St. Amand; Thomas M. Phillips

[57] ABSTRACT

A deceleration sled to decelerate and safely contain a launched test missile. The sled has crushable honeycomb which absorbs the initial impact of the missile as the sled accelerates along a track to the same speed as the missile. As the deceleration sled is pushed down the rails, forming shoes on both sides of the sled engage flat metal plates. The forming shoes roll the flat plates into a "U" shape. The energy required to roll these plates can be changed by varying their thickness.

4 Claims, 4 Drawing Figures

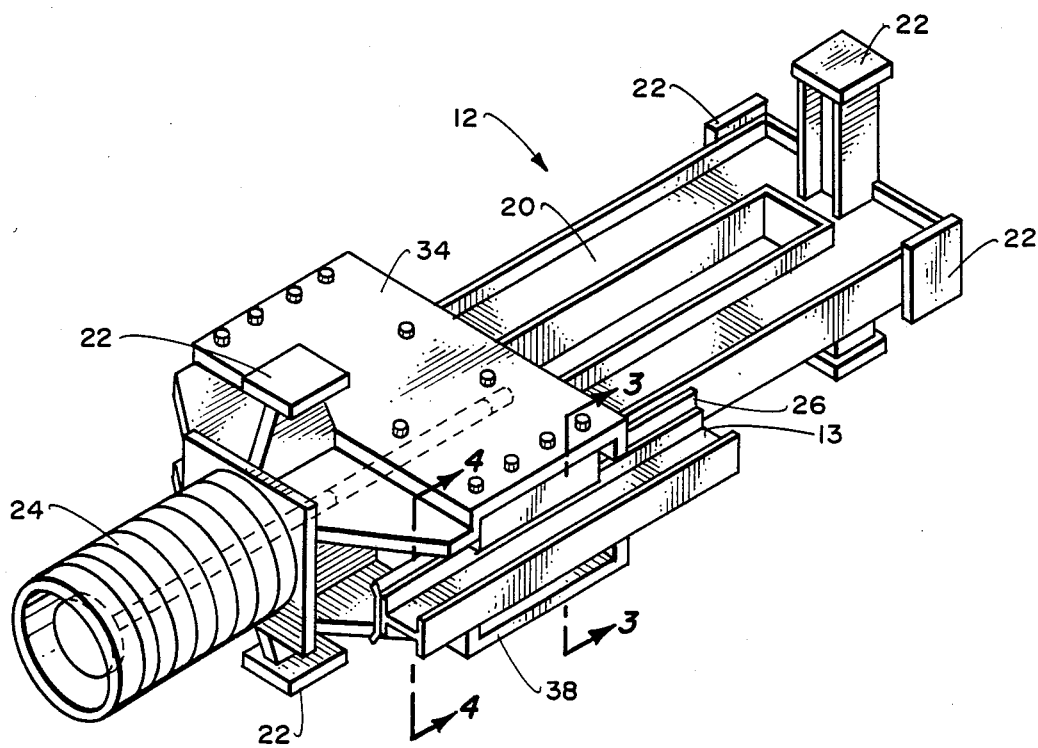
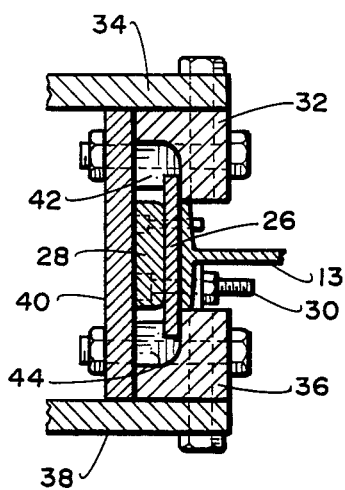 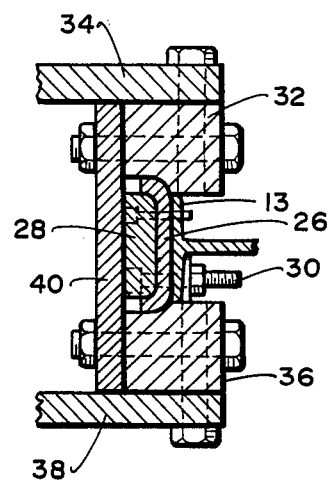
Fig. 2.
Fig. 3.  Fig. 4.

GROUND LAUNCHED MISSILE CONTROLLED RATE DECELERATOR

BACKGROUND OF THE INVENTION

The present invention relates to energy absorbers and more particularly to energy absorbers in the form of a decelerator sled for controlling the rate of deceleration of a missile under test installed in a restrained firing test fixture.

When testing missiles under restrained firing conditions, it is essential that the missile is decelerated within a short distance (20-40 feet).

SUMMARY OF THE INVENTION

The present invention provides for a simple, yet controlled means for decelerating and safety containing ground launched test missiles under restrained firing conditions. A sled is constructed for traveling on the tracks of a firing fixture on which a test missile will traverse when propelled by a missile rocket motor. The sled has crushable honeycomb which absorbs the initial impact of the missile and causes the sled to accelerate. The sled is provided with forming shoes that engage metal plates on both sides along the tracks. As the deceleration sled is pushed down the rails, the forming shoes rolls the flat plates into a "U" shape. The energy required to roll these plates can be controlled and is determined by varying their thickness.

Accordingly an object of the invention is to provide a controlled means of decelerating and safely containing a launched test missile.

Another object of the invention is to provide a controlled means of decelerating and safety containing a launched test missile providing a sled with forming shoes that rolls flat plates as the sled is pushed by the launched missile to provide a controlled deceleration rate which can be changed as the sled moves down the tracks.

Other objects, advantages and novel features of the invention will become apparent from the following detailed description of the invention when considered in conjunction with the accompanying drawings wherein:

BRIEF DESCRIPTION OF THE DRAWINGS

FIG. 2 is a prospective view of the sled of FIG. 1.

FIG. 3 is a sectional view taken along the line 3—3 of FIG. 2, and

FIG. 4 is a sectional view taken along the line 4—4 of FIG. 2.

DESCRIPTION OF THE PREFERRED EMBODIMENT

Figure 1:
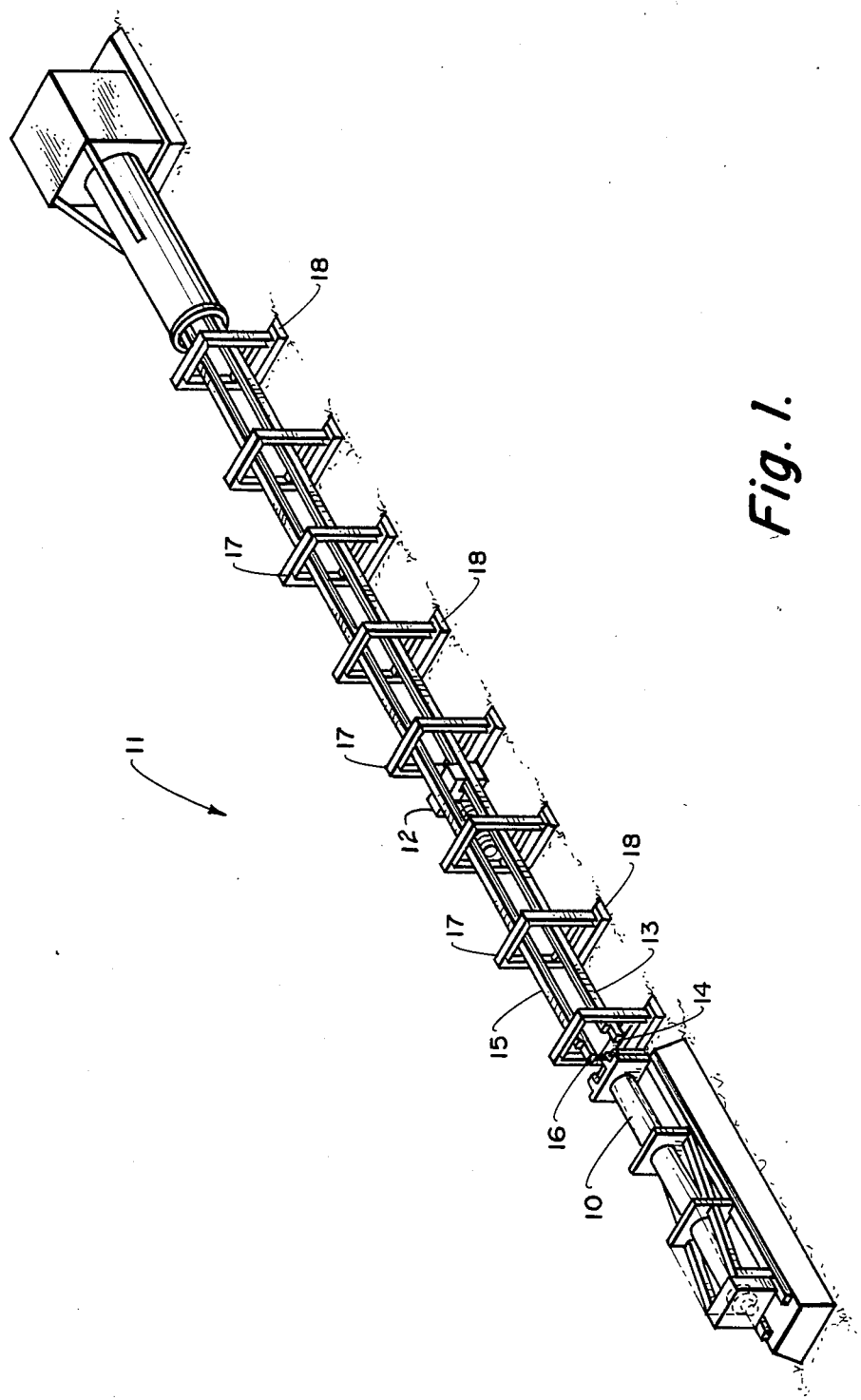
FIG. 1 is an overall prospective view of the invention.

Referring now to the drawings wherein there is shown in FIG. 1 an overall view of the test facility utilizing a deceleration sled for the controlled rate deceleration of the restrained firing of a missile. A dummy missile (not shown) having a rocket motor to be tested is placed in the missile launcher 10. In line and adjacent to missile launcher 10 is a rail system 11 along which the launched missile will traverse until it engages decelerator sled 12 and comes to rest within a safe distance of travel. Rail system 11 consists of four tracks 13, 14, 15 and 16 mounted within frames 17 that are secured to foundations 18. As can be seen, sled 12 is constrained within the inside boundaries of the four rails.

Sled 12 is shown in more detail in FIG. 2 and consists of a rectangular frame 20 having six rail slides 22 afixed such that sled 12 will be centered within the four rails. A crushable honeycomb energy absorber 24 is mounted on one end of frame 22 for absorbing the initial impact of the missile. Also mounted on frame 20 is an arrangement of upper and lower pairs of tapered forming shoes that cooperate with stationary mandrels to roll a plate bar 26 into a "U" shape.

The arrangement is shown in detail in FIGS. 3 and 4 for one side of sled 12. Plate 26 and mandrel 28 are bolted by means of bolts 30 to the inside face of rail 13. Upper forming shoe 32 is bolted to upper mounting plate 34. Lower forming shoe 36 is bolted to lower mounted plate 38. Further support is provided by vertical mounting brace 40.

In operation, when the rocket engine is fired, the missile accelerates and moves within rail system 11 until it engages energy absorber 24 and accelerates sled 12. The missile and sled move together along the rail system until they decelerate to a complete stop.

In FIGS. 3 and 4, the two section views are sections of the device before and after rolling, looking in the direction of travel. FIG. 3 shows plate 26 just before tapered forming shoes 32 and 36 move over it. As the inside tapers 42, 44 contact the upper and lower edges, respectively, of plate 26, rolling them over into the shape shown in FIG. 4, the missile's energy is absorbed.

Obviously many modifications and variation of the present invention are possible in light of the above teachings. It is therefore to be understood that within the scope of the appended claims the invention may be practiced otherwise than as specifically described.

What is claimed is:

1. In a ground launched missile controlled rate decelerator for a dummy missile under test, the combination comprising:
    a. a dummy missile having a rocket motor for accelerating said dummy missile when fired;
    b. movable support means in the path of said dummy missile and being operable to move at the same rate of speed as said dummy missile in response to a collision thereof;
    c. stationary support means;
    d. tapered forming shoes being mounted on said movable support means;
    e. mandrel means being mounted on said stationary support means; and
    f. flat plate means mounted on said stationary support means and engaging said forming shoes so that relative movement between said movable support means and said stationary support means will cause said forming shoes to move over the upper and lower edges of said plate, rolling them over into a "U" shape.

2. The combinatin of claim 1 wherein said moveable support means is a sled.

3. The combination of claim 2 wherein said stationary support means includes a rail system.

4. The combination of claim 1 wherein the amount of energy to be expanded is controlled by the thickness of said flat plate means.

* * * * *